(12) United States Patent
Glover

(10) Patent No.: US 8,849,885 B2
(45) Date of Patent: Sep. 30, 2014

(54) SATURATION DETECTOR

(75) Inventor: Clinton Thomas Glover, Austin, TX (US)

(73) Assignee: Via Technologies, Inc., New Taipei (TW)

( * ) Notice: Subject to any disclaimer, the term of this patent is extended or adjusted under 35 U.S.C. 154(b) by 345 days.

(21) Appl. No.: 13/491,260

(22) Filed: Jun. 7, 2012

(65) Prior Publication Data

US 2013/0332496 A1 Dec. 12, 2013

(51) Int. Cl.
*G06F 7/499* (2006.01)

(52) U.S. Cl.
USPC .......................................... 708/550

(58) Field of Classification Search
None
See application file for complete search history.

(56) References Cited

U.S. PATENT DOCUMENTS

| | | | | |
|---|---|---|---|---|
| 5,633,815 A | * | 5/1997 | Young | 708/204 |
| 5,734,879 A | * | 3/1998 | Gallup et al. | 712/221 |
| 2002/0188640 A1 | * | 12/2002 | Catherwood | 708/550 |
| 2004/0073773 A1 | * | 4/2004 | Demjanenko | 712/7 |
| 2006/0277277 A1 | * | 12/2006 | Landschaft et al. | 709/220 |
| 2013/0332496 A1 | * | 12/2013 | Glover | 708/203 |

* cited by examiner

*Primary Examiner* — David H Malzahn
(74) *Attorney, Agent, or Firm* — E. Alan Davis; James W. Huffman; Michael B. Davis

(57) ABSTRACT

A hardware integer saturation detector that detects both whether packing a 32-bit integer value causes saturation and whether packing each of first and second 16-bit integer values causes saturation, where the first 16-bit integer value is the upper 16 bits of the 32-bit integer value and the second 16-bit integer value is the lower 16 bits of the 32-bit integer value. The detector includes hardware signal logic, configured to generate four signals with information about the integer values. The hardware integer detector also includes saturation logic, configured to gate the four signals to generate a saturation signal. Each bit of the saturation signal indicates whether packing the 32-bit integer value or whether packing one of the first and second 16-bit integer values will cause saturation respectively.

20 Claims, 9 Drawing Sheets

US 8,849,885 B2

SATURATION DETECTOR

FIELD OF THE INVENTION

The present invention relates in general to the field of microprocessors, and particularly to detecting saturation of packed integers therein.

BACKGROUND OF THE INVENTION

Modern microprocessors allow storing of integers in a packed format such that one processor register holds several packed integers. Packed integer operations then operate on each packed integer in the processor register. Many architectures include special instructions for packing integers and dealing with packed integer values, such as the x86 MMX, SSE, and AVX instructions, among others. Packed integers are often truncated representations of integer values. For example, packing often includes storing 32-bit integer values using 16 bits or 16-bit integer values using 8 bits.

For example, the x86 PACKSSWB instruction packs 16-bit word signed integer values in 8-bit signed integer values. The x86 PACKSSDW instruction packs 32-bit double-word signed integer values into 16-bit signed integers. Both instructions are defined to detect signed saturation, and to indicate signed saturation by placing a particular value in a packed integer result.

Saturation occurs when an integer is too large or small to be represented when packed as a smaller number of bits. For example, some signed 32-bit numbers are too large or too small to be stored using 16 bits. Also, some unsigned 32-bit numbers are too large to be stored using 16 bits. When packing integers, saturation may result in incorrect operation, so it is necessary to detect and indicate that saturation has occurred.

Typically, the same processor registers are used for both 32-bit and 16-bit packing operations. For example, x86 XMM registers can hold several 32-bit values, or twice as many 16-bit values. Microprocessor designers strive to use gates efficiently for each function of the processor to reduce area and power consumption and meet timing constraints. A solution is needed that detects saturation of packed integers of multiple widths using a single module with an efficient configuration of processor logic gates.

BRIEF SUMMARY OF INVENTION

In one aspect the present invention provides hardware integer saturation detector, configured to detect whether packing a 32-bit integer value causes saturation and whether packing each of first and second 16-bit integer values causes saturation, wherein the first 16-bit integer value is the upper 16 bits of the 32-bit integer value and the second 16-bit integer value is the lower 16 bits of the 32-bit integer value. The hardware integer saturation module includes hardware signal logic, configured to generate: a 3-bit signal A that indicates whether a most significant bit of the 32-bit integer value and each of the first and second 16-bit integer values is a 0 or a 1; a 3-bit signal B that indicates whether a most significant bit of a least significant word of the 32-bit integer value and whether a most significant bit of a least significant byte of each of the first and second 16-bit integer values is a 0 or a 1; a 3-bit signal C that indicates whether a most significant word of the 32-bit integer value is equal to 0xFFFF and whether a most significant byte of each of the first and second 16-bit integer values is equal to 0xFF; and a 3-bit signal D that indicates whether a most significant word of the 32-bit integer value is equal to 0x0000 and whether a most significant byte of each of the first and second 16-bit integer values is equal to 0x00. The hardware integer saturation module also includes hardware saturation logic, configured to: NAND the bits of signal B with the bits of signal C to form a signal E; NAND the bits of signal D with the inverted bits of signal B to form a signal F; MUX between the bits of signal E and signal F using the bits of signal A as control signals to form a signal J; MUX between signal J and an inverted signal D to form a 3-bit saturation signal, using a signal that indicates whether the packing operation is signed or unsigned as a control signal.

In another aspect, the present invention provides a method for detecting saturation caused by a packed integer operation for both a 32-bit integer value and first and second 16-bit integer values comprised in the 32-bit integer value. The method includes NANDing the bits of a signal B with the bits of a signal C to form a signal E, wherein signal B is a 3-bit signal that indicates whether a most significant bit of a least significant word of the 32-bit integer value and whether a most significant bit of a least significant byte of each of the first and second 16-bit integer values is a 0 or a 1, and wherein signal C is a 3-bit signal that indicates whether a most significant word of the 32-bit integer value is equal to 0xFFFF and whether a most significant byte of each of the first and second 16-bit integer values is equal to 0xFF. The method also includes NANDing the bits of a signal D with an inverted signal B to form a signal F, wherein signal D is a 3-bit signal that indicates whether a most significant word of the 32-bit integer value is equal to 0x0000 and whether a most significant byte of each of the first and second 16-bit integer values is equal to 0x00. The method also includes MUXing between the bits of signal E and signal F using the bits of signal A as control signals to form a signal J, wherein signal A is a 3-bit signal A that indicates whether a most significant bit of the 32-bit integer value and each of the first and second 16-bit integer values is a 0 or a 1. The method also includes MUXing between signal J and an inverted signal D to form a 3-bit saturation signal using a control signal, wherein the control signal is a signal that indicates whether the packing operation is signed or unsigned.

In yet another aspect, the present invention provides a hardware apparatus for detecting saturation caused by a packed integer operation for both a 32-bit integer value and first and second 16-bit integer values, wherein the 32-bit integer value comprises the first and second 16-bit integer values. The apparatus includes hardware logic configured to receive: a 3-bit signal A that indicates whether a most significant bit of the 32-bit integer value and each of the first and second 16-bit integer values is a 0 or a 1; a 3-bit signal B that indicates whether a most significant bit of a least significant word of the 32-bit integer value and whether a most significant bit of a least significant byte of each of the first and second 16-bit integer values is a 0 or a 1; a 3-bit signal C that indicates whether a most significant word of the 32-bit integer value is equal to 0xFFFF and whether a most significant byte of each of the first and second 16-bit integer values is equal to 0xFF; and a 3-bit signal D that indicates whether a most significant word of the 32-bit integer value is equal to 0x0000 and whether a most significant byte of each of the first and second 16-bit integer values is equal to 0x00. The hardware logic is further configured to generate in response to the received signals A, B, C and D: a signal F according to the equation: $F[2:0]=\sim(\sim B[2:0]\ \&\ D[2:0])$; a signal E according to the equation: $E[2:0]=\sim(B[2:0]\ \&\ C[2:0])$; a signal J according to the equation: $J[2:0]=(A[2:0]\ \&\ E[2:0])|(\sim A[2:0]\ \&\ F[2:0])$; and a saturation signal SAT[2:0], according to the equation: sat[2:0]=signed ? J[2:0]: ~D[2:0], wherein signed is a signal that indicates whether the packed integer operation results in signed values.

In yet another aspect, the present invention provides method for detecting saturation caused by a packed integer operation for both a 32-bit integer value and first and second 16-bit integer values, wherein the 32-bit integer value comprises the first and second 16-bit integer values. The method includes receiving: a 3-bit signal A that indicates whether a most significant bit of the 32-bit integer value and each of the first and second 16-bit integer values is a 0 or a 1; a 3-bit signal B that indicates whether a most significant bit of a least significant word of the 32-bit integer value and whether a most significant bit of a least significant byte of each of the first and second 16-bit integer values is a 0 or a 1; a 3-bit signal C that indicates whether a most significant word of the 32-bit integer value is equal to 0xFFFF and whether a most significant byte of each of the first and second 16-bit integer values is equal to 0xFF; and a 3-bit signal D that indicates whether a most significant word of the 32-bit integer value is equal to 0x0000 and whether a most significant byte of each of the first and second 16-bit integer values is equal to 0x00. The method also includes generating a signal F according to the equation: F[2:0]=~(~B[2:0] & D[2:0]); generating a signal E according to the equation: E[2:0]=~(B[2:0] & C[2:0]); generating a signal J according to the equation: J[2:0]=(A[2:0] & E[2:0]) |(~A[2:0] & F[2:0]); and generating a saturation signal SAT [2:0], according to the equation: sat[2:0]=signed ? J[2:0]: ~D[2:0], wherein signed is a signal that indicates whether the packed integer operation results in signed values.

DETAILED DESCRIPTION OF THE INVENTION

Glossary

Packing an integer value is representing the integer value using a smaller number of bits. For example, representing a 32-bit integer value using only 16-bits, or representing a 16-bit integer value using only 8-bits.

A packed integer is an integer that has been packed according to the definition of packing above.

A double-word refers to 32 bits, a word refers to 16 bits, and a byte refers to 8 bits.

Description of the Embodiments

Embodiments of the present invention detect saturation in integer packing operations of multiple widths using a single processor module and a small number of processor gates.

Figure 1:
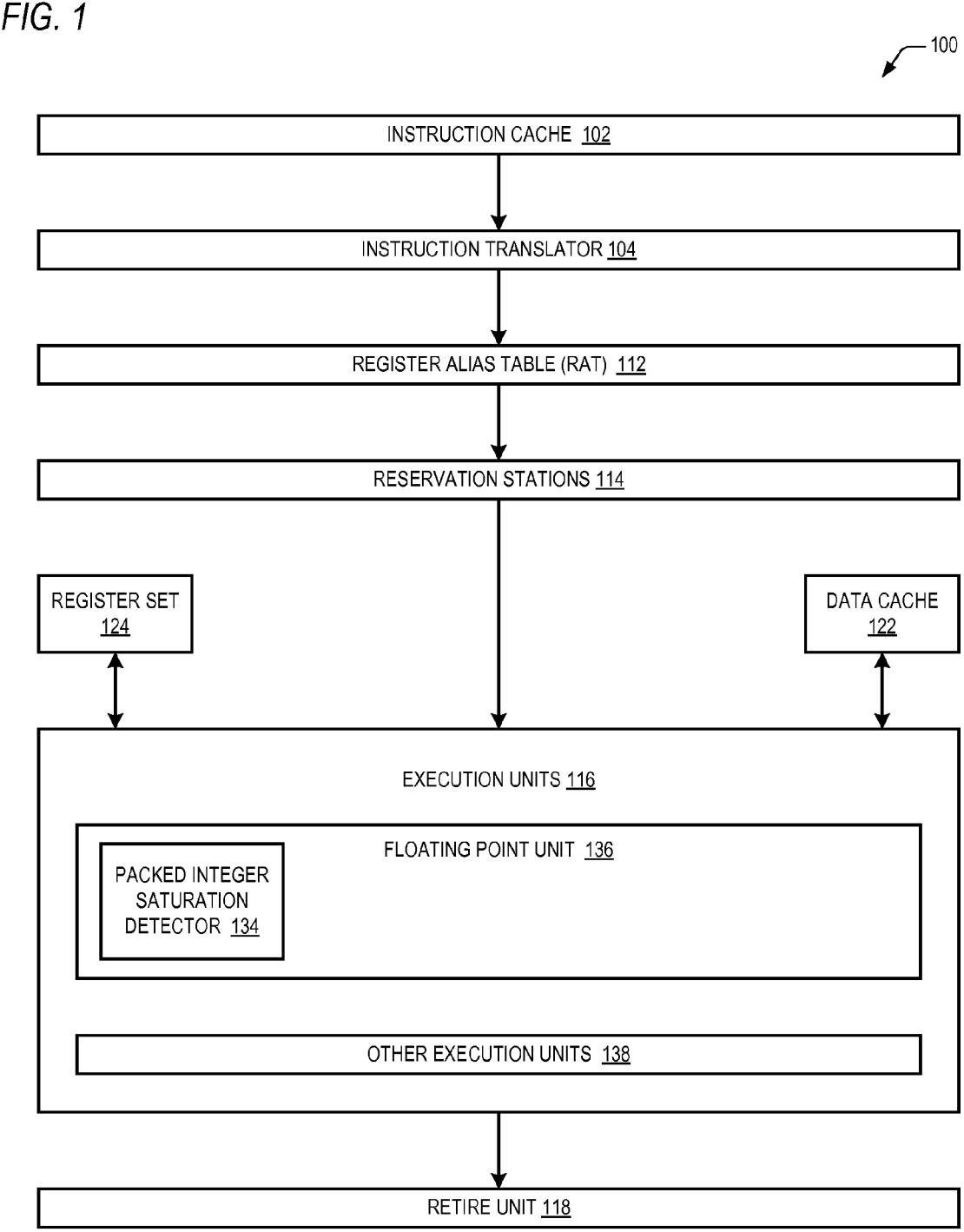
FIG. 1 is a block diagram illustrating a microprocessor comprising an integer saturation detector according to the present invention.

Referring now to FIG. 1, a block diagram shows a microprocessor 100 including a packed integer saturation detector 134 according to the present invention. The microprocessor 100 includes an instruction cache 102 that caches instructions fetched from a system memory (not shown). An instruction translator 104 is coupled to receive instructions, such as x86 instruction set architecture packed integer instructions, from the instruction cache 102. A register alias table (RAT) 112 is coupled to receive translated microinstructions from the instruction translator 104 to generate dependency information for the translated microinstructions. Reservation stations 114 are coupled to receive the translated microinstructions and dependency information from the RAT 112. Execution units 116 are coupled to receive the translated microinstructions from the reservation stations 114 and to receive instruction operands for the translated microinstructions. The operands may come from a register set 124 and from a data cache 122 coupled to the execution units 116. A retire unit 118 is coupled to receive instruction results from the execution units 116 and to retire the results to architectural state of the microprocessor 100. The execution units 116 include a floating point unit 136 and other execution units 138. The floating point unit 136 includes packed integer saturation detector 134. The packed integer saturation detector 134 is a single processor module configured to determine saturation of packed integers of multiple widths. The packed integer saturation detector 134 is shown as located in the floating point unit in this embodiment, primarily because x86 packed integer instructions generally use MMX or XMM registers in the floating point unit. In other embodiments, the packed integer saturation detector 134 may be located elsewhere in microprocessor 100, within or coupled to units that perform packed integer operations.

Figure 2A:
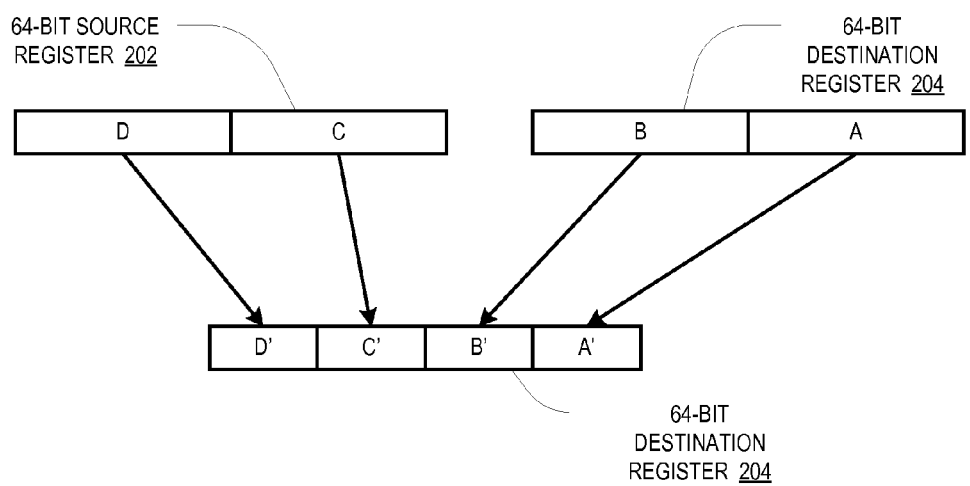
FIGS. 2A and 2B are block diagrams illustrating operation of integer packing instructions.
Figure 2B:
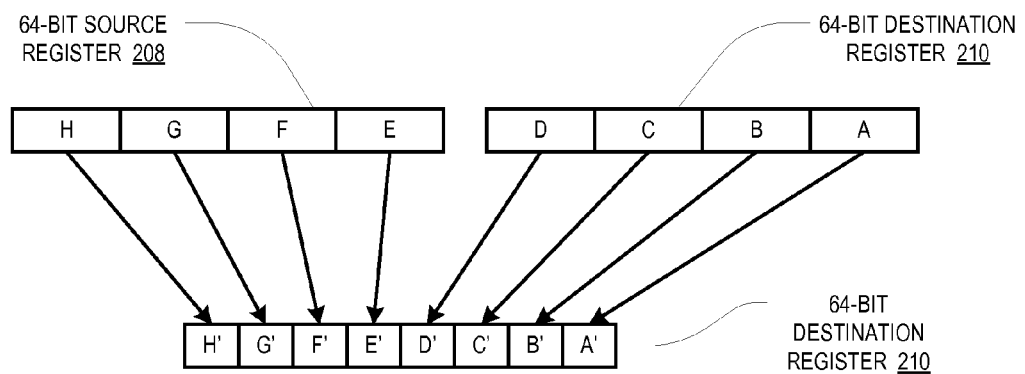

Referring now to FIGS. 2A and 2B, two examples of x86 instructions that pack integers are shown. The PACKSSDW of FIG. 2A instruction packs four 32-bit double-word signed integer values (such as A, B, C, and D of FIG. 2A) into four 16-bit signed integers (such as A', B', C' and D' of FIG. 2A) and detects signed saturation. The PACKSSDW instruction is defined to return specific pre-defined values when saturation occurs. For example, 32-bit integer 0x00000123 (hexadecimal) is packed to 16 bits as 0x0123 with no saturation. But, a 32-bit integer with a positive value of 0x000F1234 saturates to 0x7FFF when packed to 16-bits. 0x7FFF is the largest value that can be stored using 16-bits, and is used in the x86 architecture to indicate signed saturation in the positive direction. Similarly, a 32-bit integer with a negative value of 0xFFFF1234 saturates to 0x8000 when packed to 16-bits. 0x8000 is the smallest value that can be stored using 16-bits, and is used in the x86 architecture to indicate signed saturation in the negative direction. In embodiments of microprocessor 100 that execute the x86 instruction set architecture, packed integer saturation detector 134 must detect signed saturation for instructions such as PACKSSDW and microprocessor 100 must provide correct packed results based on the detected saturation.

FIG. 2A shows two 64-bit operands: 64-bit source register 202 and 64-bit destination register 204. 64-bit destination register 204 is both a source and destination register in this example. However, integer packing instructions can usually accommodate various operand widths. For example, source and destination registers for the PACKSSDW operation may be 128-bits or 256 bits instead of 64-bits. Larger operands do not change the packing operation for integer values within the operands, but pack more 32-bit values than the four 32-bit values of FIG. 2A.

PACKUSDW is a similar instruction to PACKSSDW, but packs 32-bit signed integers as 16-bit unsigned integers. Positive saturation (32-bit numbers larger than 0xFFFF) is indicated using the value 0xFFFF and negative saturation (numbers smaller than 0) is indicated using the value 0x0000.

Referring now to FIG. 2B, the PACKSSWB instruction packs 16-bit word signed integer values (such as elements A through H of FIG. 2B) into 8-bit signed integer values (such as elements A' through H' of FIG. 2B). When saturation occurs, 8-bit packed integer results are set to 0x7F and 0x80 to indicate positive and negative saturation respectively.

PACKUSWB is a similar instruction to PACKSSWB, but packs 16-bit signed integers as 8-bit unsigned integers. When saturation occurs, 8-bit packed integer results are set to 0xFF and 0x00 to indicate positive and negative saturation respectively.

FIG. 2B shows 2 64-bit operands: 64-bit source register 208 and 64-bit destination register 210. As mentioned previously, other operand widths may be used with these instructions, or other instructions.

Generally, registers that are capable of holding N 32-bit double-word integers to be packed are also capable of holding 2N 16-bit word integers to be packed and the same registers are used to hold operands for both types of packing operations (double-word and word). Other types of instructions may also cause integer saturation in addition to integer packing instructions, and packed integer saturation detector 134 may detect saturation caused by these other types of instructions. The instructions illustrated by FIGS. 2A and 2B are x86 packed integer instructions with specific x86 saturation values. Packed integer saturation detector 134 may detect saturation for other packed integer instructions in embodiments of microprocessor 100 that execute instructions of various other instruction set architectures including, but not limited to: ARM, MIPS, SPARC, or PowerPC.

Figure 3:
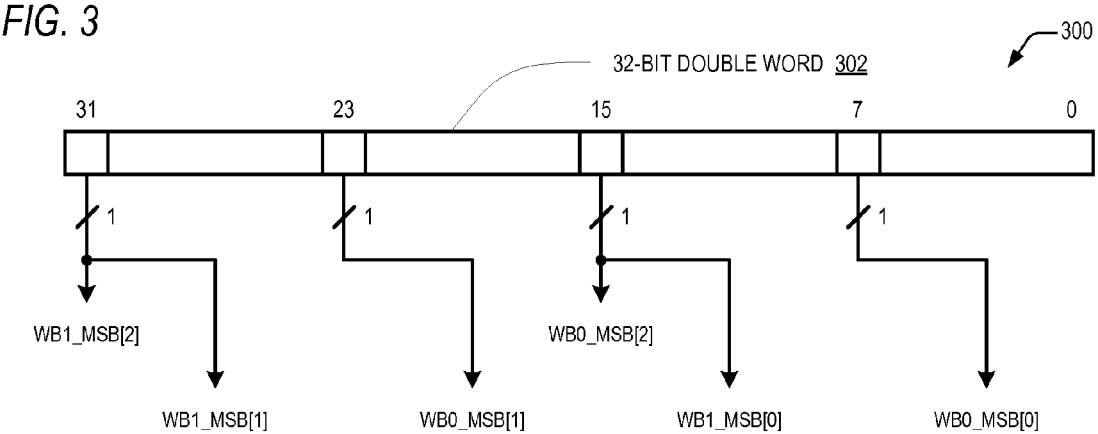
FIG. 3 is a block diagram illustrating signal logic that generates signals for an integer saturation detector according to the present invention.
Figure 3:
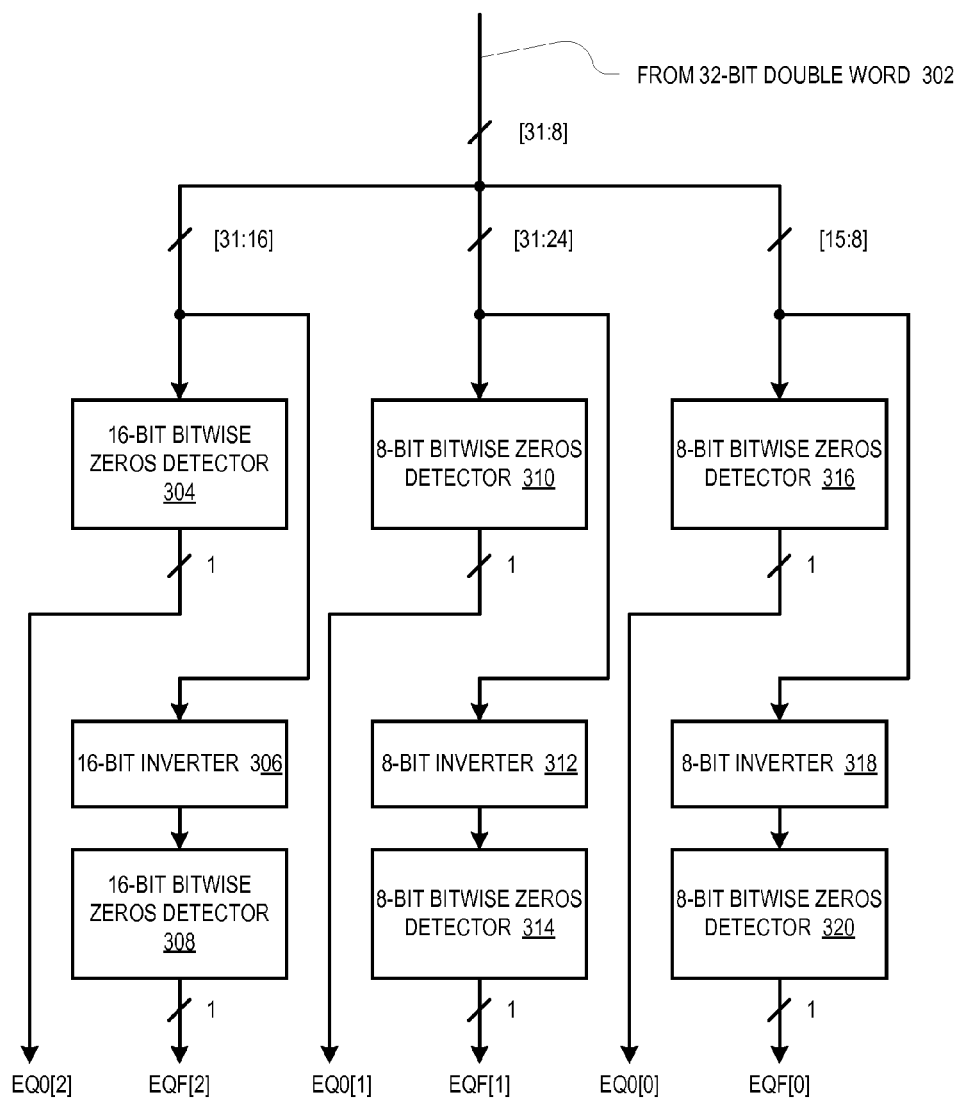

Referring now to FIG. 3, signal logic 300 generates signals for packed integer saturation detector 134. Signal logic block 300 may be located within saturation detector 134 or in some other processor element or module. Signal logic block 300 generates signals for one 32-bit double-word, so the operations shown in FIGS. 2A and 2B require four signal logic blocks 300 to generate signals for all four 32-bit and all eight 16-bit integers to be packed.

Signal logic 300 generates a signal WB1_MSB[2] and a signal WB0_MSB[2] representing the most significant bits of the upper and lower words in the 32-bit double word 302 respectively. Similarly, signal logic 300 generates signals WB1_MSB[1], WB0_MSB[1], WB1_MSB[0], and WB0_MSB[0] corresponding to most significant bits of the four bytes of 32-bit double word 302.

Signal logic 300 also generates signals indicating whether certain words and bytes of the 32-bit double-word are all zeros or all ones. 16-bit bitwise zeros detectors 304 and 308 determine whether bits [31:16] of 32-bit double-word 302 are equal to 0x0000 and 0xFFFF respectively, and indicate the results in signals EQ0[2] and EQF[2] respectively.

8-bit bitwise zeros detectors 310 and 314 determine whether bits [31:24] of 32-bit double-word 302 are equal to 0x00 and 0xFF respectively, and indicate the results in signals EQ0[1] and EQF[1] respectively. 8-bit bitwise zeros detectors 316 and 320 determine whether bits [15:8] of 32-bit double-word 302 are equal to 0x00 and 0xFF respectively, and indicate the results in signals EQ0[0] and EQF[0] respectively.

In other embodiments, other elements may be used to generate signals having the same significance to those in FIG. 3. For example, a 16-bit bitwise ones detector could replace 16-bit inverter and 16-bit bitwise zeros detector 306.

In summary, signal logic 300 outputs four signals: EQ0[2:0], EQF[2:0], WB1_MSB[2:0] and WB0_MSB[2:0]. The index of the bits in each signal corresponds to whether the information is for the entire 32-bit double-word 302 (bits at index 2), the upper 16-bit word (bits at index 1), or the lower 16-bit word (bits at index 0). For operations such as those shown in FIGS. 2A and 2B, four signal logic blocks 300 may be required. For other packed integer operations, N signal logic blocks 300 are required, where N is the number of 32-bit register portions involved in the operation. Note that 2N 16-bit register portions are involved in an operation with N 32-bit register portions. Signal logic 300 generates signals for both detecting saturation when packing 32-bit integers and detecting saturation when packing 16-bit integers.

Figure 4:
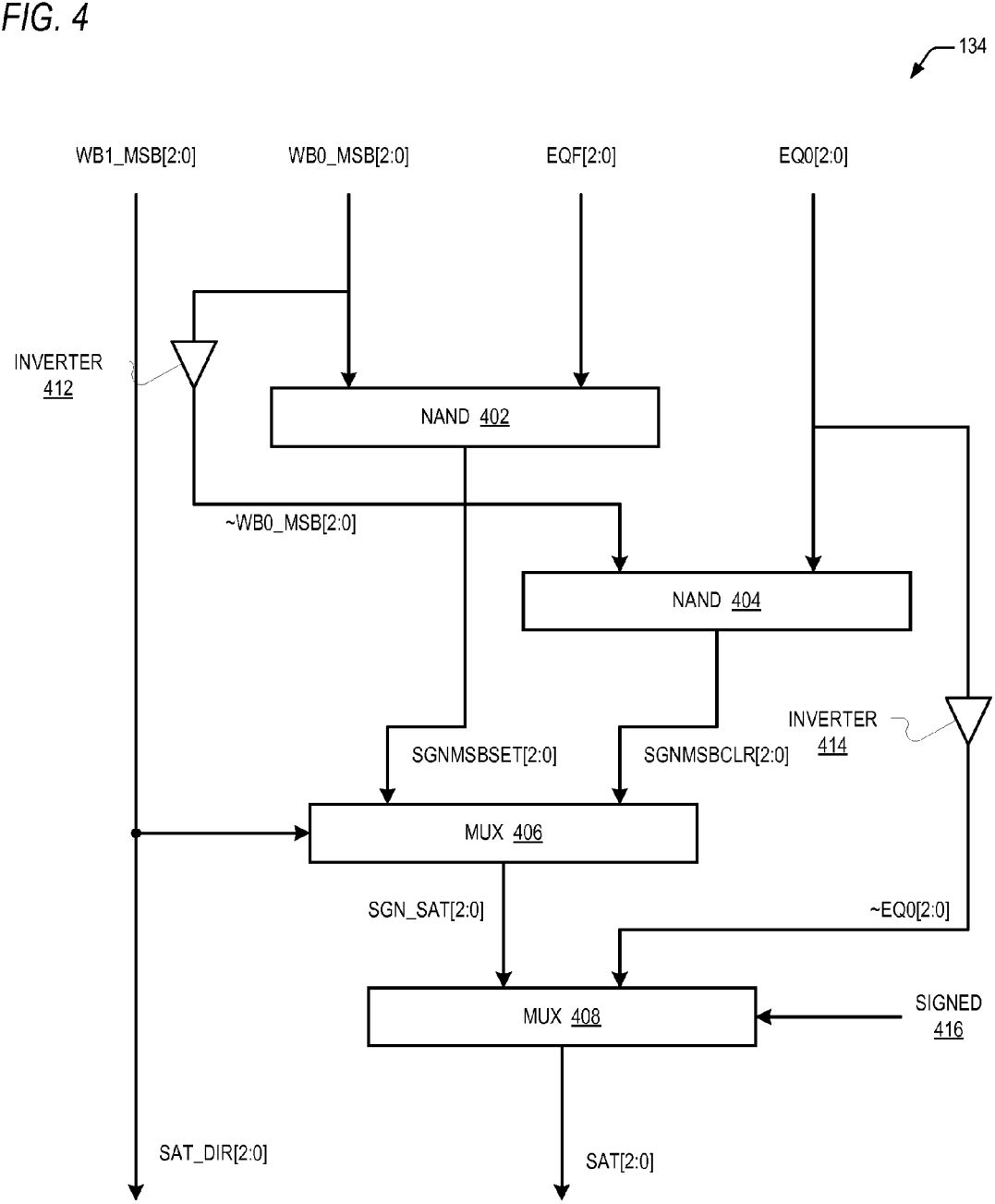
FIG. 4 is a block diagram illustrating one embodiment of an integer saturation detector according to the present invention.

Referring now to FIG. 4, integer saturation detector 134 includes two NAND gates 402 and 404, two MUX's 406 and 408, and two inverters 412 and 414. Signals WB1_MSB[2:0], WB0_MSB[2:0], EQF[2:0], and EQ0[2:0] are supplied from signal logic 300 of FIG. 3. A SIGNED signal 416 indicates whether a given packing operation gives a signed or unsigned result. Floating point unit 136 may generate SIGNED signal 416, or some other element may provide SIGNED signal 416. Inverter 412 inverts signal WB0_MSB[2:0] to generate signal ~WB0_MSB[2:0]. Inverter 414 inverts signal EQ0[2:0] to generate signal ~EQ0[2:0].

WB0_MSB[2:0] is NANDed with EQF[2:0] using NAND 402 to generate a signal SGNMSBSET[2:0]. The inverted bits of WB0_MSB [2:0] are NANDed with EQ0[2:0] using NAND 404 to generate a signal SGNMSBCLR[2:0]. The three bits of WB1_MSB[2:0] are used as control signals for MUX 406 to select between the bits of SGNMSBSET[2:0] and SGNMSBCLR[2:0] to generate a signal SGN_SAT[2:0]. If a bit of WB1_MSB[2:0] is a 1, MUX 406 passes the bit in the same index in signal SGNMSBSET[2:0], whereas if a bit of WB1_MSB[2:0] is a 0, MUX 406 passes the bit in the same index in signal SGNMSBCLR[2:0]. A bit set to 1 in signal SGN_SAT[2:0] indicates that signed saturation occurred for the value corresponding to the bit (either a 32-bit value, an upper 16-bit value, or a lower 16-bit value depending on the bit).

In order to also handle saturation when results of integer packing are to be unsigned, SIGNED is used as a control signal for MUX 408 to select between SGN_SAT[2:0] and ~EQ0[2:0] to generate signal SAT[2:0]. If the packing operation gives unsigned packed results, SIGNED=0 and ~EQ0[2:0] is selected by MUX 408, whereas if the packing operation gives signed results, SIGNED=1 and SGN_SAT[2:0] is selected by MUX 408. Each bit of signal SAT[2:0] indicates whether packing the corresponding 32-bit or 16-bit value will result in saturation for a given signed or unsigned packing operation.

Note that in the embodiment of FIG. 4, the longest path that any signal takes passes through an inverter 412, a NAND gate 404, and two MUXes 406 and 408. Including signal logic from FIG. 3, the longest path that any signal takes passes through an inverter 312, a zeros detector 314, a NAND gate 402, and two MUXes 406 and 408.

In some architectures such as x86, the saturation result is different depending on the direction of saturation (i.e. positive or negative). WB1_MSB[2:0] indicates whether an integer value to be packed is positive or negative, which indicates the direction of saturation should saturation occur, so this signal is passed on as SAT_DIR[2:0].

Figure 5:
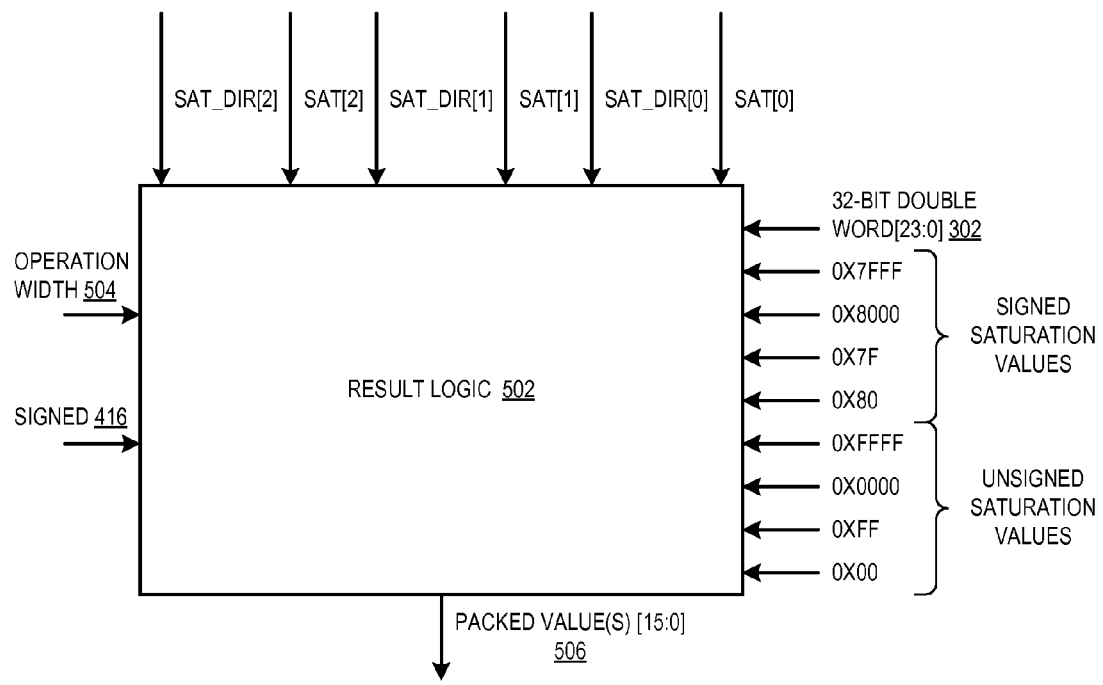
FIG. 5 is a block diagram illustrating result logic for providing a correct packed integer result based on signals from the saturation detector of FIG. 4.

Referring now to FIG. 5, result logic 502 takes the SAT_DIR[2:0] signal and the SAT[2:0] signal from integer saturation detector 134 in order to give a correct packed integer result of an operation. Result logic 502 also takes an operation width signal 504 as an input, which indicates whether a given packing operation packs 32-bit or 16-bit integer values. Result logic 502 also takes the SIGNED signal 416 of FIG. 4 as an input. Result logic 502 also takes the lower 24 bits of the 32-bit double word 302 of FIG. 3 and eight pre-defined saturation values as inputs, namely 0x7FFF, 0x8000, 0x7F, 0x80, 0xFFFF, 0x0000, 0xFF, and 0x00.

Various embodiments of microprocessor 100 may implement result logic 502 differently. Examples of result logic 502 operation are given below based on various types of packed integer operations and various results from packed integer saturation detector 134.

As a first example, the operation width signal 504 indicates a 32-bit packing operation, and SIGNED signal 416 indicates a signed result. If SAT[2] is a 0, indicating no saturation, the lower 16 bits of 32-bit double-word 302 are passed as packed value 506. But, if SAT[2] is a 1, indicating saturation, SAT_DIR[2] controls whether result logic 502 passes 0x7FFF or 0x8000 as packed value 506 to indicate positive or negative saturation, respectively.

As a second example, the operation width signal 504 indicates a 32-bit packing operation, and SIGNED signal 416 indicates an unsigned result. If SAT[2] is a 0, indicating no saturation, the lower 16 bits of 32-bit double-word 302 are passed as packed value 506. But, if SAT[2] is a 1, indicating saturation, SAT_DIR[2] controls whether result logic 502 passes 0xFFFF or 0x0000 as packed value 506 to indicate positive or negative saturation, respectively.

As a third example, the operation width signal 504 indicates a 16-bit packing operation, and SIGNED signal 416 indicates a signed result. If SAT[1] is a 0, indicating no saturation, the lower 8 bits of the upper 16-bit word of 32-bit double-word 302 are passed as packed value[15:8] 506. Similarly, if SAT[0] is a 0, the lower 8 bits of the lower 16-bit word of 32-bit double-word 302 are passed as packed value[7:0] 506. But, if SAT[1] is a 1, indicating saturation, SAT_DIR[1] controls whether result logic 502 passes 0x7F or 0x80 as upper half (bits [15:8]) of packed value 506 to indicate positive or negative saturation, respectively; and if SAT[0] is a 1, indicating saturation, SAT_DIR[0] controls whether result logic 502 passes 0x7F or 0x80 as lower half (bits [7:0]) of packed value 506 to indicate positive or negative saturation, respectively.

As a fourth example, the operation width signal 504 indicates a 16-bit packing operation, and SIGNED signal 416 indicates an unsigned result. If SAT[1] is a 0, indicating no saturation, the lower 8 bits of the upper 16-bit word of 32-bit double-word 302 are passed as packed value[15:8] 506. Similarly, if SAT[0] is a 0, the lower 8 bits of the lower 16-bit word of 32-bit double-word 302 are passed as packed value[7:0] 506. But, if SAT[1] is a 1, indicating saturation, SAT_DIR[1] controls whether result logic 502 passes 0xFF or 0x00 as upper half (bits [15:8]) of packed value 506 to indicate positive or negative saturation, respectively; and if SAT[0] is a 1, indicating saturation, SAT_DIR[0] controls whether result logic 502 passes 0xFF or 0x00 as lower half (bits [7:0]) of packed value 506 to indicate positive or negative saturation, respectively.

The examples above referring to FIG. 5 show how result logic 502 uses the output signals of integer saturation detector 134 in order to specify a correct packed integer result as signal 506. The values described are relevant to x86 embodiments of microprocessor 100; however, the signed and unsigned saturation values of FIG. 5 may be different in other embodiments.

Figure 6:
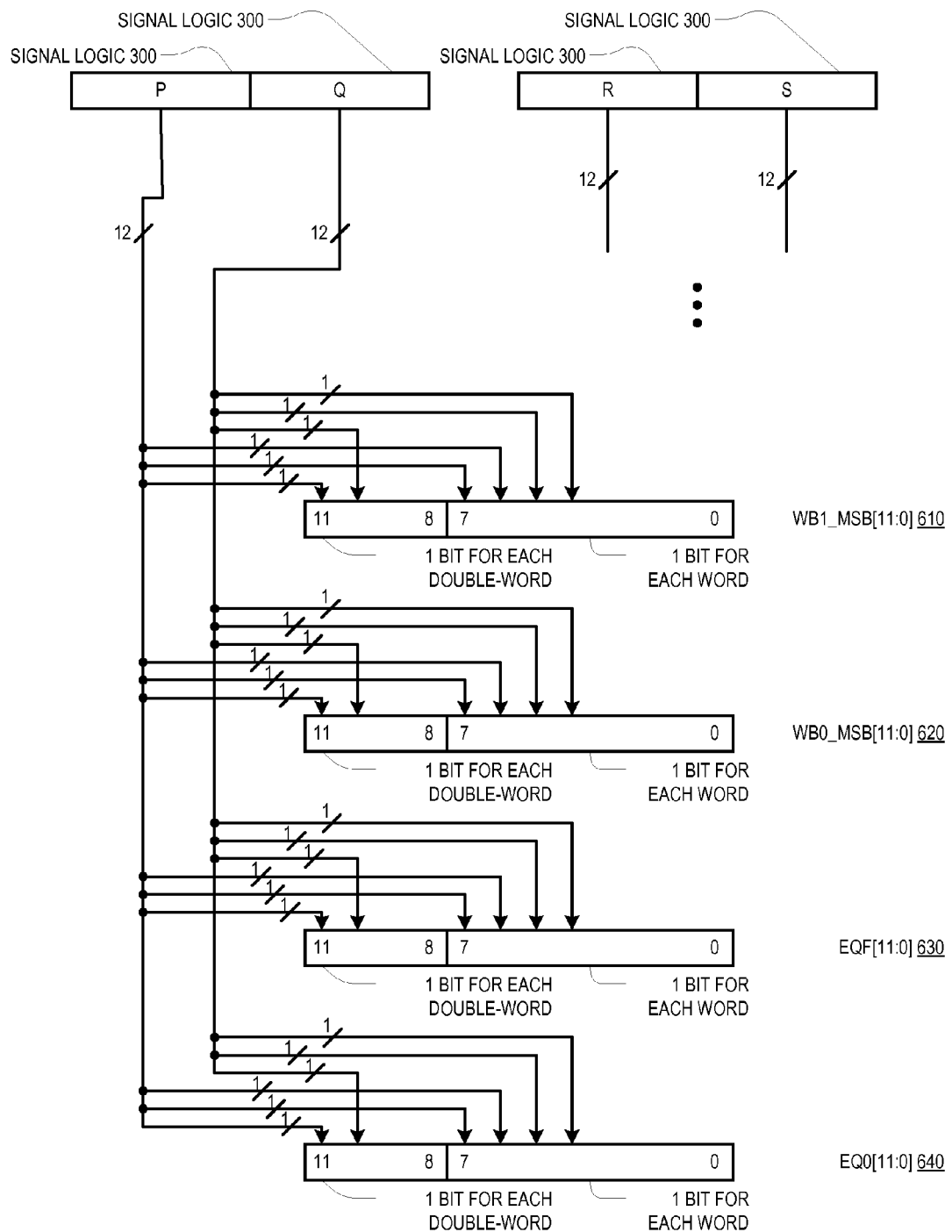
FIG. 6 is a block diagram illustrating aggregation of signals from four signal logic blocks of FIG. 3.

Referring now to FIG. 6, four instances of signal logic 300 of FIG. 3, denoted blocks P, Q, R and S, generate signals 610-640 for an integer packing operation that takes two 64-bit operands. Recall that signal logic 300 generates four 3-bit signals: WB1_MSB[2:0], WB1_MSB[2:0], EQF[2:0], and EQ0[2:0]. In the embodiment of FIG. 6, four 12-bit signals are formed from by combining the signals generated by the four instances of signal logic 300, namely: WB1_MSB[11:0] 610, WB1_MSB[11:0] 620, EQF[11:0] 630, and EQ0[11:0] 640. For example, the 3-bit signal WB1_MSB[2:0] from block S is split up and rearranged, with WB1_MSB[2] assigned to WB1_MSB[11], WB1_MSB[1] assigned to WB1_MSB[7] and WB1_MSB[0] assigned to WB1_MSB[6], and the 3-bit signal WB1_MSB[2:0] from block R is split up and rearranged, with WB1_MSB[2] assigned to WB1_MSB[10], WB1_MSB[1] assigned to WB1_MSB[5] and WB1_MSB[0] assigned to WB1_MSB[4], as shown in FIG. 6. The assignment of signals from signal logic blocks P and Q is not explicitly shown, however, the 3-bit signal WB1_MSB[2:0] from block Q is split up and rearranged, with WB1_MSB[2] assigned to WB1_MSB[9], WB1_MSB[1] assigned to WB1_MSB[3] and WB1_MSB[0] assigned to WB1_MSB[2], and the 3-bit signal WB1_MSB[2:0] from block P is split up and rearranged, with WB1_MSB[2] assigned to WB1_MSB[8], WB1_MSB[1] assigned to WB1_MSB[1] and WB1_MSB[0] assigned to WB1_MSB[0]. Similar assignments are made with respect to signals WB0_MSB[11:0] 620, EQF[11:0] 630, and EQ0[11:0] 640. FIG. 6 illustrates one embodiment of organizing signals for an entire packed integer operation; however, according to other embodiments, various arrangements of bits may be used, in order to combine the four 3-bit signals from each signal logic block 300 into four 12-bit signals for the entire packed integer operation. In other embodiments, different operand sizes may be used, and a greater or lesser number of signal logic blocks 300 may be required to generate signals. The four generated signals (WB1_MSB, WB0_MSB, EQF and EQ0) each comprise 3N bits where N is the number of signal logic blocks 300. Blocks 610-640 are meant to represent bit indices within a signal. Signals 610-640 may be stored in a register, available on a processor wire, or otherwise provided to integer saturation detector 134.

Figure 7:
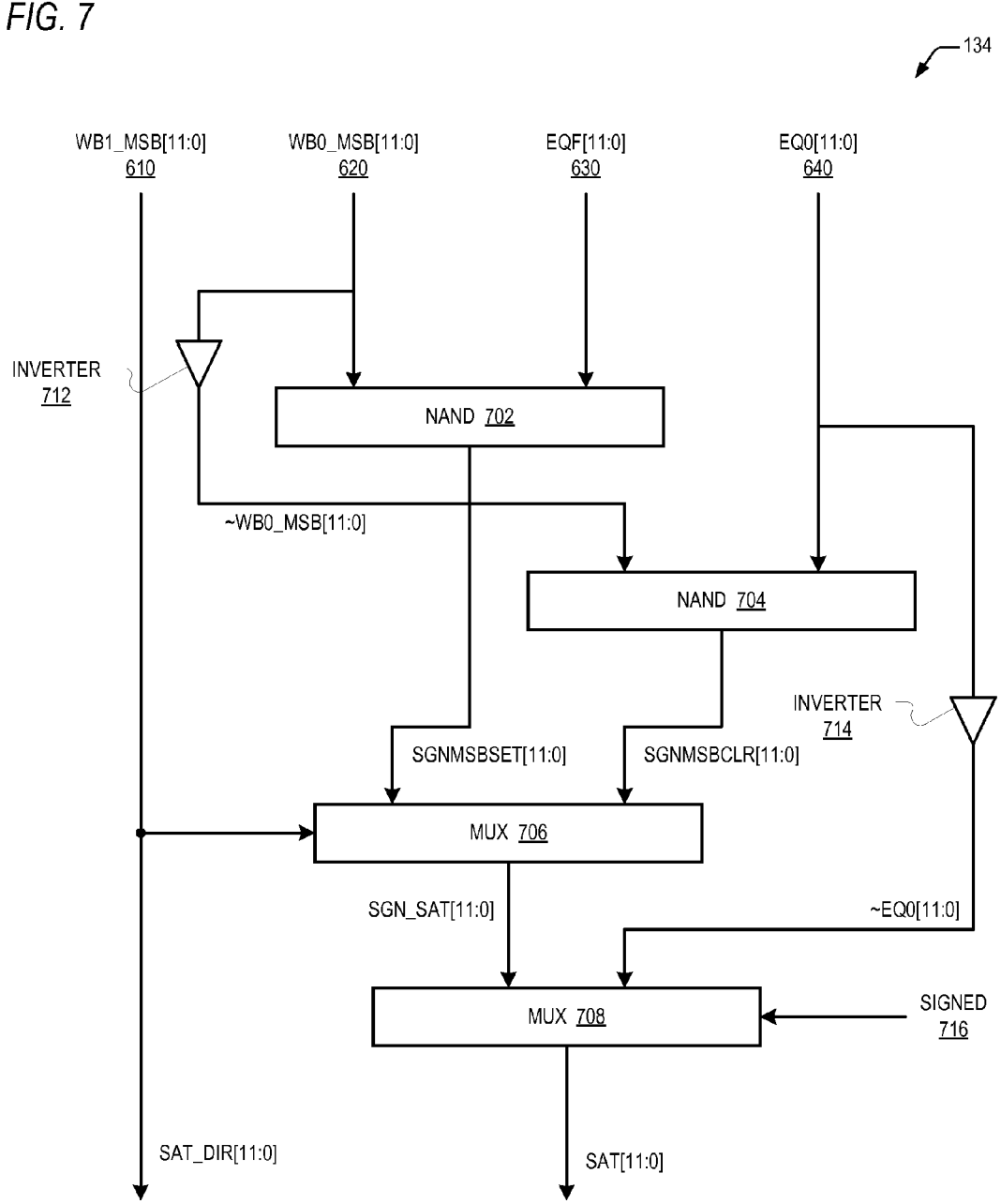
FIG. 7 is a block diagram illustrating one embodiment of an integer saturation detector for two 64-bit operands according to the present invention.

Referring now to FIG. 7, one embodiment of integer saturation detector 134 is shown for detecting saturation within an integer packing operation with two 64-bit operands. FIG. 7 uses similar logic elements to FIG. 4, but the signals 610-640 (of FIG. 6) shown in FIG. 7 include bits generated four signal logic blocks 300 of FIG. 3 instead of one.

Integer saturation detector 134 of FIG. 7 includes two NAND gates 702 and 704, two MUX's 706 and 708, and two inverters 712 and 714. Signals WB1_MSB[11:0] 610, WB0_MSB[11:0] 620, EQF[11:0] 630, and EQ0[11:0] 640 are supplied from signal logic 300. A SIGNED signal 716 indicates whether a packing operation will have a signed or unsigned result. Floating point unit 136 may generate signed signal 716, or some other processor element may provide signed signal 716. Inverter 712 inverts signal WB0_MSB[11:0] to generate signal ~WB0_MSB[11:0]. Inverter 714 inverts signal EQ0[11:0] to generate signal ~EQ0[11:0].

WB0_MSB[11:0] is NANDed with EQF[11:0] using NAND 702 to generate a signal SGNMSBSET[11:0]. The inverted bits of WB0_MSB [11:0] are NANDed with EQ0 [11:0] using NAND 704 to generate a signal SGNMSBCLR [11:0]. The twelve bits of WB1_MSB[11:0] are used as control signals for MUX 706 to select between the bits of SGNMSBSET[11:0] and SGNMSBCLR[11:0] to generate a signal SGN_SAT[11:0]. If a bit of WB1_MSB[11:0] is a 1, MUX 706 passes the bit in the same index in signal SGNMSBSET[11:0], whereas if a bit of WB1_MSB[11:0] is a 0, MUX 706 passes the bit in the same index in signal SGNMSBCLR[11:0]. A bit set to 1 in signal SGN_SAT[11:0] indicates signed saturation in the value corresponding to the bit (either a 32-bit value, an upper 16-bit value, or a lower 16-bit value depending on the bit).

In order to also handle saturation when results of integer packing are to be unsigned, SIGNED is used as a control signal for MUX 708 to select between SGN_SAT[11:0] and ~EQ0[11:0] to generate signal SAT[11:0]. If the packing operation gives unsigned packed results, SIGNED=0 and ~EQ0[11:0] is selected, whereas if the packing operation gives signed results, SIGNED=1 and SGN_SAT[11:0] is selected. Each bit of signal SAT[11:0] indicates whether packing the corresponding 32-bit or 16-bit value will result in saturation for a given signed or unsigned packing operation.

In some architectures such as x86, the saturation result is different depending on the direction of saturation (i.e. positive or negative). WB1_MSB[11:0] indicates whether an integer value to be packed is positive or negative, which indicates the direction of saturation should saturation occur, so this signal is passed on as SAT_DIR[11:0].

Table 1 below shows an example Verilog module which the gates of FIG. 7 implement. Line 1 of Table 1 declares the single module sat detect, which is capable of detecting saturation in a packed integer operation for both four 32-bit integer values and for eight 16-bit integer values comprised in the four 32-bit integer values. Line 2 defines the 12-bit output SAT. Line 3 defines the SIGN input signal, which is used as previously described in FIG. 7. The WB1_MSB, WB0_MSB, EQF, and EQ0 input signals corresponding to similarly named signals in FIG. 7. In FIG. 7, line 8 was implemented using MUX 708, line 9 implemented using NAND 702, line 10 implemented using NAND 704 and line 11 implemented using MUX 708. Note that Verilog is a hardware description language, and the order of lines 8-11 does not necessarily correspond to an order of the operations performed by hardware elements corresponding to those lines. In other embodiments, other elements may be used to perform the functionality defined by the code of Table 1.

TABLE 1

| (1) | module sat_detect |
| --- | --- |
| (2) | output [11:0] sat, |
| (3) | input sign, |
| (4) | input [11:0] wb1_msb, |
| (5) | input [11:0] wb0_msb, |
| (6) | input [11:0] eqf, |
| (7) | input [11:0] eq0; |
| (8) | sgn_sat[11:0] = ( wb1_msb[11:0] & sgnmsbset[11:0]) \| (~wb1_msb[11:0] & sgnmsbclr[11:0]); |
| (9) | sgnmsbset[11:0] = ~(eqf[11:0] & wb0_msb[11:0]); |
| (10) | sgnmsbclr[11:0] = ~(eq0[11:0] & ~wb0_msb[11:0]); |
| (11) | sat[11:0] = sign ? sgn_sat[11:0] : ~eq0[11:0]; |
| (12) | endmodule |

Figure 8:
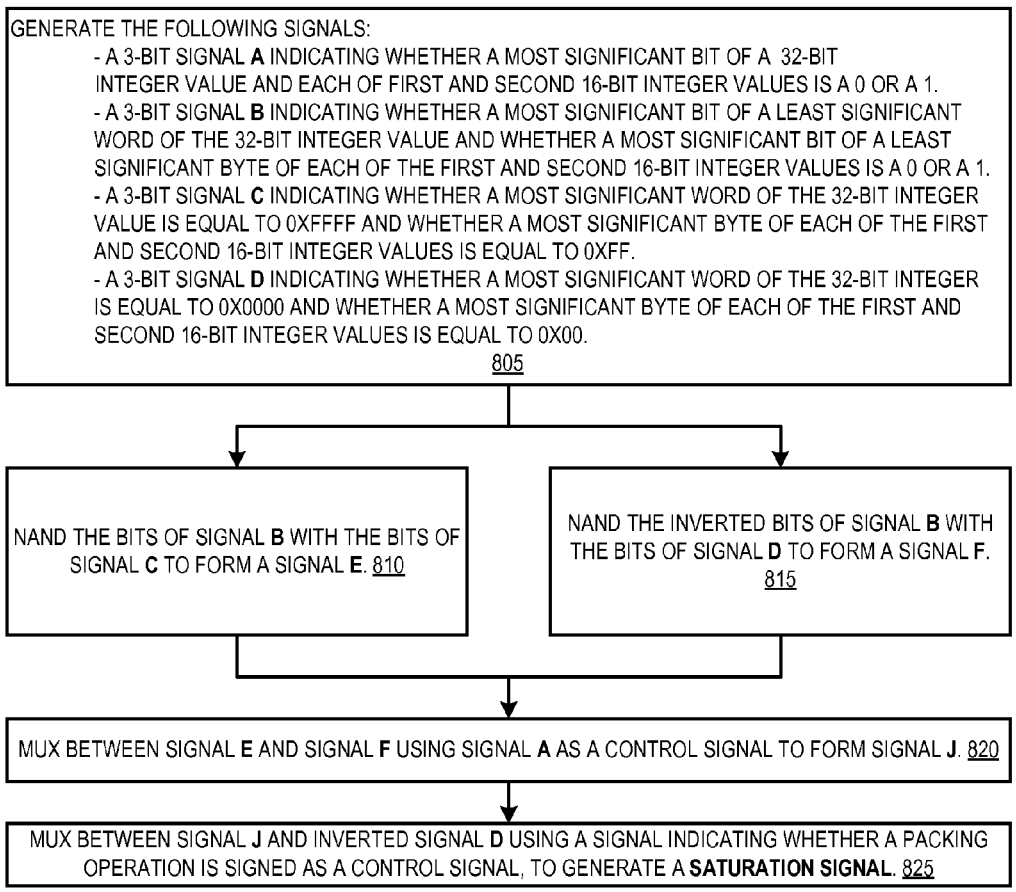
FIG. 8 is a flowchart illustrating one embodiment of a method for detecting packed integer saturation.

Turning now to FIG. 8, a flowchart illustrates one embodiment of a method for detecting saturation in a packed integer operation for both a 32-bit integer value and for two 16-bit integer values comprised in the 32-bit integer value. Flow begins at block 805.

At block 805, signal logic 300 generates four signals. In other embodiments, other elements may generate similar signals. The first signal is a 3-bit signal A indicating whether a most significant bit of the 32-bit integer value and each of the first and second 16-bit integer values is a 0 or a 1. This signal corresponds to the WB1_MSB signal of FIG. 4. The second signal is a 3-bit signal B indicating whether a most significant bit of a least significant word of the 32-bit integer value and whether a most significant bit of a least significant byte of each of the first and second 16-bit integer values is a 0 or a 1. This signal corresponds to the WB0_MSB signal of FIG. 4. The third signal is a 3-bit signal C indicating whether a most significant word of the 32-bit integer value is equal to 0xFFFF and whether a most significant byte of each of the first and second 16-bit integer values is equal to 0xFF. This signal corresponds to the EQF signal of FIG. 4. The fourth signal is a 3-bit signal D indicating whether a most significant word of the 32-bit integer value is equal to 0x0000 and whether a most significant byte of each of the first and second 16-bit integer values is equal to 0x00. This signal corresponds to the EQ0 signal of FIG. 4. Flow proceeds to blocks 810 and 815 concurrently.

At block 810, integer saturation detector 134 NANDs the bits of signal B with the bits of signal C to form a signal E. Signal E corresponds to the SGNMSBSET signal of FIG. 4. Flow proceeds to block 820.

At block 815, integer saturation detector 134 NANDs the inverted bits of signal B with the bits of signal D to form a signal F. Signal F corresponds to the SGNMSBCLR signal of FIG. 4. Flow proceeds to block 820.

At block 820, integer saturation detector 134 MUXs between signal E and signal F using signal A as a control signal to form a signal J. Signal J corresponds to the SGN_SAT signal of FIG. 4. Since signal A is a 3-bit signal, each of the bits of signal A may be used to control a 1-bit, two-input MUX. A[2] may MUX between E[2] and F[2], A[1] between E[1] and F[1], and A[0] between E[0] and F[0]. Flow proceeds to block 825.

At block 825, integer saturation detector 134 MUXs between signal J and inverted signal D using a signal indicating whether a packing operation is signed or unsigned as a control signal. The control signal corresponds to the signal SIGNED 416 of FIG. 4. Signal J corresponds to the signal SAT of FIG. 4.

When a packing operation for a signed integer value has an unsigned result, saturation occurs under two conditions: (1) when the integer value is too great to represent in packed form and (2) when the integer value is negative. If there are any 1's in the upper bits of the integer value, one or both of these conditions has occurred. Since a set bit in signal ~D (inverted signal D) indicates that at least one of the upper bits in the integer value is not a 0, unsigned saturation for a corresponding integer value is indicated when a bit in signal D is set.

When a packing operation on a signed integer value has a signed result, signal J indicates whether saturation has occurred. If the most significant bit of a double-word or word is a 1, signal J will indicate whether or not an upper word or byte are 1's and a most significant bit of a lower word or byte is a 1 (no saturation if both true). If the most significant bit of a double-word or word is a 0, signal J will indicate whether or not all upper bits of a word are 0's and a most significant bit of a lower word or byte is a 0 (no saturation if both true). Therefore, each bit of signal J indicates whether signed saturation has occurred for a packed word or byte corresponding to the bit. Flow ends at block 825.

Figure 9:
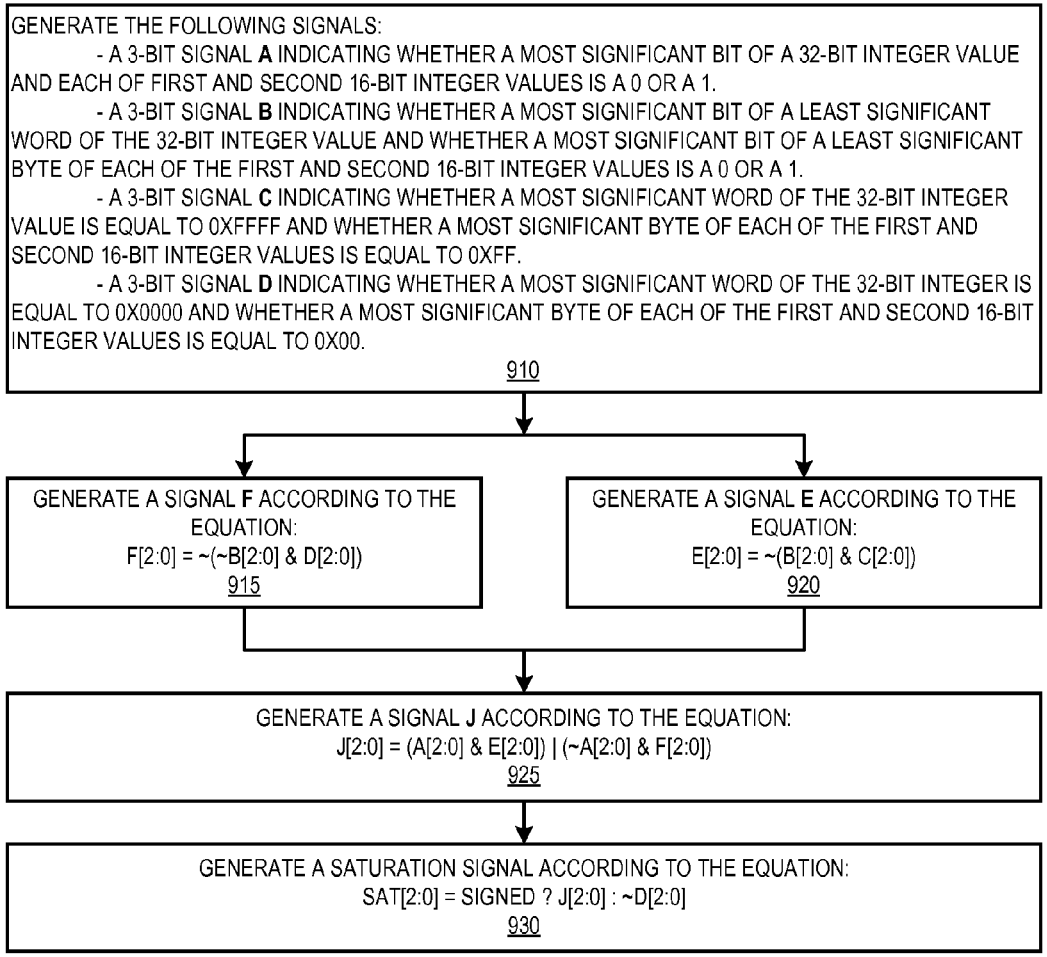
FIG. 9 is a flowchart illustrating another embodiment of a method for detecting packed integer saturation.

Turning now to FIG. 9, a flowchart illustrates a second embodiment of a method for detecting saturation in a packed integer operation for both a 32-bit integer value and for two 16-bit integer values comprised in the 32-bit integer value. Flow begins at block 910.

At block 910, signal logic 300 generates four signals. In other embodiments, other elements may generate similar signals. The first signal is a 3-bit signal A indicating whether a most significant bit of the 32-bit integer value and each of the first and second 16-bit integer values is a 0 or a 1. This signal corresponds to the WB1_MSB signal of FIG. 4. The second signal is a 3-bit signal B indicating whether a most significant bit of a least significant word of the 32-bit integer value and whether a most significant bit of a least significant byte of each of the first and second 16-bit integer values is a 0 or a 1. This signal corresponds to the WB0_MSB signal of FIG. 4. The third signal is a 3-bit signal C indicating whether a most significant word of the 32-bit integer value is equal to 0xFFFF and whether a most significant byte of each of the first and second 16-bit integer values is equal to 0xFF. This signal corresponds to the EQF signal of FIG. 4. The fourth signal is a 3-bit signal D indicating whether a most significant word of the 32-bit integer value is equal to 0x0000 and whether a most significant byte of each of the first and second 16-bit integer values is equal to 0x00. This signal corresponds to the EQ0 signal of FIG. 4. Flow proceeds to blocks 915 and 920 concurrently.

At block 915, hardware integer saturation detector 134 generates a signal F according to the equation: F[2:0]=~(~B[2:0] & D[2:0]) where '~' indicates bitwise inversion and '&' indicates a bitwise AND. One embodiment of a gate for performing this operation is shown in FIG. 4 as NAND gate 402, but integer saturation detector 134 may include other gates to accomplish the same functionality in other embodiments. Flow proceeds to block 925.

At block 920, hardware integer saturation detector 134 generates a signal E according to the equation: E[2:0]=~(B[2:0] & C[2:0]) where '~' indicates bitwise inversion and '&' indicates a bitwise AND. One embodiment of a gate for performing this operation is shown in FIG. 4 as NAND gate 404, but integer saturation detector 134 may include other gates to accomplish the same functionality in other embodiments. Flow proceeds to block 925.

At block 925, hardware integer saturation detector 134 generates a signal J according to the equation: J[2:0]=(A[2:0] & E[2:0])|(~A[2:0] & F[2:0]), where '~' indicates bitwise inversion, '&' indicates a bitwise AND, and '|' indicates bitwise OR. One embodiment of a gate for performing this operation is shown in FIG. 4 as MUX 406. Flow proceeds to block 930.

At block 930, hardware integer saturation detector 134 generates a saturation signal SAT[2:0]. The bits of SAT correspond to whether packing each of a 32-bit integer value and two 16-bit integer values comprised in the 32-bit integer value will result in saturation. In one embodiment, SAT[2] corresponds to a 32-bit integer value, SAT[1] to an upper 16-bit integer value, and SAT[0] to a lower 16-bit integer value. Integer saturation detector 134 generates the saturation signal SAT according to the equation: SAT[2:0]=SIGNED ? J[2:0]: ~D[2:0]. This equation indicates that if SIGNED is a 1, SAT[2:0]=J[2:0], whereas if SIGNED is a 0, SAT[2:0]=~D[2:0]. One embodiment of a gate for performing this operation is shown in FIG. 4 as MUX 408. Flow ends at block 930.

The methods illustrated in FIGS. 8 and 9 may be expanded to include more than one 32-bit integer value for wider bit packing operations such as those shown in FIGS. 2A and 2B. Signals and gates may be expanded similarly to the expansion to four 32-bit integer values shown in FIGS. 6 and 7. However, expansion is not limited to four 32-bit integer values as shown in FIGS. 6 and 7, but may be expanded to eight or sixteen 32-bit integer values in 128-bit or 256-bit operands.

Various embodiments of saturation detection for packing operations for 32-bit and 16-bit are described above. In other embodiments, other integer widths may be used. For example, if a processor architecture supports packing of 64-bit integer values, integer saturation detector 134 may be modified to detect saturation of 64-bit integer packing operations. In one embodiment, a single hardware integer saturation detector module 134 simultaneously detects saturation of a 64-bit integer value, two 32-bit integer values comprised in the 64-bit integer value, and four 16-bit integer values comprised in the 64-bit integer value. A saturation signal comprises a bit corresponding to the 64-bit integer value, a bit for each of the two 32-bit integer values comprised in the 64-bit integer value, and a bit for each of the four 16-bit integer values comprised in the 64-bit integer value. These bits indicate, for the corresponding integer value, whether a packing operation on that value will cause saturation. Further, in other embodiments, the widths of operands may be greater or smaller than those of the present disclosure.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied, or specified, in a HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

I claim:

1. A hardware integer saturation detector, configured to detect whether packing a 32-bit integer value causes saturation and whether packing each of first and second 16-bit integer values causes saturation, wherein the first 16-bit integer value is the upper 16 bits of the 32-bit integer value and the second 16-bit integer value is the lower 16 bits of the 32-bit integer value, the hardware integer saturation module comprising:
  hardware signal logic, configured to generate:
    a 3-bit signal A that indicates whether a most significant bit of the 32-bit integer value and a most significant bit of each of the first and second 16-bit integer values is a 0 or a 1;
    a 3-bit signal B that indicates whether a most significant bit of a least significant word of the 32-bit integer value and whether a most significant bit of a least significant byte of each of the first and second 16-bit integer values is a 0 or a 1;
    a 3-bit signal C that indicates whether a most significant word of the 32-bit integer value is equal to 0xFFFF and whether a most significant byte of each of the first and second 16-bit integer values is equal to 0xFF; and
    a 3-bit signal D that indicates whether a most significant word of the 32-bit integer value is equal to 0x0000 and whether a most significant byte of each of the first and second 16-bit integer values is equal to 0x00; and
  hardware saturation logic, configured to:
    NAND the bits of signal B with the bits of signal C to form a signal E;
    NAND the bits of signal D with the inverted bits of signal B to form a signal F;
    MUX between the bits of signal E and signal F using the bits of signal A as control signals to form a signal J;
    MUX between signal J and an inverted signal D to form a 3-bit saturation signal, using a signal that indicates whether the packing operation is signed or unsigned as a control signal.

2. The hardware integer saturation detector of claim 1, wherein each bit of the saturation signal indicates whether packing the 32-bit integer value or whether packing one of the first and second 16-bit integer values will cause saturation respectively.

3. The hardware integer saturation detector of claim 1, wherein each bit of signal A indicates a direction of saturation for the 32-bit integer value or one of the first and second 16-bit integer values respectively.

4. The hardware integer saturation detector of claim 1, further comprising:
  hardware saturation value logic, configured to generate a 16-bit result corresponding to the packed value of the 32-bit integer value or packed values of the first and second 16-bit integer values;
  wherein the 16-bit result indicates saturation and a saturation direction if the hardware integer saturation detector detects saturation.

5. The hardware integer saturation detector of claim 4, wherein the 16-bit result may be signed or unsigned, and positive or negative saturation may be indicated differently depending on whether the result is signed or unsigned.

6. The hardware integer saturation detector of claim 1, wherein signal C is generated using an inverter and a zeros detector and wherein signal D is generated using a zeros detector.

7. A method for detecting saturation caused by a packed integer operation for both a 32-bit integer value and first and second 16-bit integer values comprised in the 32-bit integer value, the method comprising:
  NANDing the bits of a signal B with the bits of a signal C to form a signal E, wherein signal B is a 3-bit signal that indicates whether a most significant bit of a least significant word of the 32-bit integer value and whether a most significant bit of a least significant byte of each of the first and second 16-bit integer values is a 0 or a 1, and wherein signal C is a 3-bit signal that indicates whether a most significant word of the 32-bit integer value is equal to 0xFFFF and whether a most significant byte of each of the first and second 16-bit integer values is equal to 0xFF;
  NANDing the bits of a signal D with an inverted signal B to form a signal F, wherein signal D is a 3-bit signal that indicates whether a most significant word of the 32-bit integer value is equal to 0x0000 and whether a most significant byte of each of the first and second 16-bit integer values is equal to 0x00;
  MUXing between the bits of signal E and signal F using the bits of signal A as control signals to form a signal J, wherein signal A is a 3-bit signal A that indicates whether a most significant bit of the 32-bit integer value and a most significant bit of each of the first and second 16-bit integer values is a 0 or a 1; and
  MUXing between signal J and an inverted signal D to form a 3-bit saturation signal using a control signal, wherein the control signal is a signal that indicates whether the packing operation is signed or unsigned.

8. The method of claim 7, wherein each bit of the saturation signal indicates whether packing the 32-bit integer value or whether packing one of the first and second 16-bit integer values will cause saturation respectively.

9. The method of claim 7, further comprising:
  generating signal C using one or more hardware inverters and one or more hardware zeros detectors; and
  generating signal D using one or more hardware zeros detectors.

10. The method of claim 7, wherein each bit of signal A indicates a direction of saturation for the 32-bit integer value or one of the first and second 16-bit integer values respectively.

11. The method of claim 7, further comprising:
  generating a 16-bit result corresponding to the packed value of the 32-bit integer value or the packed values of the first and second 16-bit integer values;
  wherein the 16-bit result indicates saturation and a direction of saturation if saturation is detected.

12. The method of claim 11, wherein the 16-bit result may be signed or unsigned, and positive or negative saturation may be indicated differently depending on whether the result is signed or unsigned.

13. A hardware apparatus for detecting saturation caused by a packed integer operation for both a 32-bit integer value and first and second 16-bit integer values, wherein the 32-bit integer value comprises the first and second 16-bit integer values, the apparatus comprising:
  hardware logic configured to receive:
    a 3-bit signal A that indicates whether a most significant bit of the 32-bit integer value and a most significant bit of each of the first and second 16-bit integer values is a 0 or a 1;
    a 3-bit signal B that indicates whether a most significant bit of a least significant word of the 32-bit integer value and whether a most significant bit of a least significant byte of each of the first and second 16-bit integer values is a 0 or a 1;
    a 3-bit signal C that indicates whether a most significant word of the 32-bit integer value is equal to 0xFFFF and whether a most significant byte of each of the first and second 16-bit integer values is equal to 0xFF; and
    a 3-bit signal D that indicates whether a most significant word of the 32-bit integer value is equal to 0x0000 and whether a most significant byte of each of the first and second 16-bit integer values is equal to 0x00;

wherein the hardware logic is further configured to generate in response to the received signals A, B, C and D:

a signal F according to the equation: F[2:0]=~(~B[2:0] & D[2:0]);

a signal E according to the equation: E[2:0]=~(B[2:0] & C[2:0]);

a signal J according to the equation: J[2:0]=(A[2:0] & E[2:0])|(~A[2:0] & F[2:0]); and a saturation signal SAT[2:0], according to the equation: sat[2:0]=signed ? J[2:0]: ~D[2:0], wherein signed is a signal that indicates whether the packed integer operation results in signed values.

14. The apparatus of claim 13, wherein each bit of SAT[2:0] indicates whether packing the 32-bit integer value or whether packing one of the first and second 16-bit integer values will cause saturation.

15. The apparatus of claim 13, wherein the hardware logic is further configured to generate in response to the received signals A, B, C and D:

a 16-bit result corresponding to the packed value of the 32-bit integer value or the packed values of the first and second 16-bit integer values, wherein the 16-bit result indicates saturation and a saturation direction if the hardware integer saturation detector detects saturation.

16. The apparatus of claim 13, wherein the hardware logic comprises:

a first NAND gate that generates signal F;

a second NAND gate that generates signal E;

a first MUX that generates signal J; and a second MUX that generates signal SAT[2:0].

17. A method for detecting saturation caused by a packed integer operation for both a 32-bit integer value and first and second 16-bit integer values, wherein the 32-bit integer value comprises the first and second 16-bit integer values, the method comprising:

receiving:

a 3-bit signal A that indicates whether a most significant bit of the 32-bit integer value and a most significant bit of each of the first and second 16-bit integer values is a 0 or a 1;

a 3-bit signal B that indicates whether a most significant bit of a least significant word of the 32-bit integer value and whether a most significant bit of a least significant byte of each of the first and second 16-bit integer values is a 0 or a 1;

a 3-bit signal C that indicates whether a most significant word of the 32-bit integer value is equal to 0xFFFF and whether a most significant byte of each of the first and second 16-bit integer values is equal to 0xFF;

a 3-bit signal D that indicates whether a most significant word of the 32-bit integer value is equal to 0x0000 and whether a most significant byte of each of the first and second 16-bit integer values is equal to 0x00;

generating a signal F according to the equation: F[2:0]=~(~B[2:0] & D[2:0]);

generating a signal E according to the equation: E[2:0]=~(B[2:0] & C[2:0]);

generating a signal J according to the equation: J[2:0]=(A[2:0] & E[2:0])|(~A[2:0] & F[2:0]);

generating a saturation signal SAT[2:0], according to the equation: sat[2:0]=signed ? J[2:0]: ~D[2:0], wherein signed is a signal that indicates whether the packed integer operation results in signed values.

18. The method of claim 17, wherein each bit of SAT[2:0] indicates whether packing the 32-bit integer value or whether packing one of the first and second 16-bit integer values will cause saturation.

19. The method of claim 17, further comprising:

generating a 16-bit result corresponding to the packed value of the 32-bit integer value or the packed values of the first and second 16-bit integer values;

wherein the 16-bit result indicates saturation and a direction of saturation if saturation is detected.

20. The method of claim 17, wherein signal F is generated using a NAND gate, signal E is generating using a NAND gate, signal J is generated using a MUX, and signal SAT[2:0] is generated using a MUX.

* * * * *